United States Patent [19]
Daudet

[11] Patent Number: 5,983,589
[45] Date of Patent: Nov. 16, 1999

[54] TRUSS PITCH BREAK CONNECTOR PLATE

[75] Inventor: L. Randy Daudet, Porter, Ind.

[73] Assignee: Dietrich Industries, Inc., Pittsburgh, Pa.

[21] Appl. No.: 08/822,434

[22] Filed: Mar. 21, 1997

[51] Int. Cl.6 .............................. E04B 1/32; E04B 7/08
[52] U.S. Cl. .............................. 52/640; 52/641; 52/643; 52/645; 52/655.1; 52/696; 52/712; 403/113; 403/205; 403/403
[58] Field of Search .................... 52/92.2, 92.1, 52/93.1, 90.1, 93.2, 639, 643, 645, 640, 641, 644, 712, 690, 696, 655.1; 403/113, 205, 403, 173, 174, 232.1, 237, 190; 16/371, 366, 321, 333, 335

[56] References Cited

U.S. PATENT DOCUMENTS

| | | |
|---|---|---|
| 2,039,125 | 4/1936 | Stuart . |
| 2,840,014 | 6/1958 | Wadsworth et al. ............... 108/23 |
| 3,596,941 | 8/1971 | Tracy .............................. 287/20.94 |
| 3,747,166 | 7/1973 | Eross .............................. 24/81 |
| 3,785,108 | 1/1974 | Satchell ........................... 52/645 |
| 4,201,021 | 5/1980 | Aldag et al. ..................... 52/93 |
| 4,538,393 | 9/1985 | Mitchell .......................... 52/641 |
| 4,580,922 | 4/1986 | Coppa ............................. 403/403 |
| 4,694,519 | 9/1987 | Benoit ............................. 5/200 |
| 4,702,638 | 10/1987 | Zalesak ........................... 403/403 |
| 4,782,641 | 11/1988 | Manenti et al. ................. 52/639 |
| 4,854,104 | 8/1989 | Pomento ......................... 52/639 |
| 5,463,837 | 11/1995 | Dry ................................. 52/639 |
| 5,524,397 | 6/1996 | Byers et al. .................... 52/92.2 |
| 5,577,353 | 11/1996 | Simpson ......................... 52/92.2 |
| 5,660,005 | 8/1997 | Tacoma ........................... 52/93.2 |

*Primary Examiner*—Christopher T. Kent
*Assistant Examiner*—Yvonne Horton-Richardson
*Attorney, Agent, or Firm*—Reed Smith Shaw & McClay LLP

[57] ABSTRACT

A truss pitch break connector plate having a main body portion. A first stiffener flange projects generally perpendicular from one face of said main body portion along an arcuate first edge having an outer radius. A second stiffener flange projects generally perpendicular from the opposite face of the main body portion along a arcuate second edge having inner radius. The main body portion preferably is generally sector-shaped but alternatively it may be circular. The overall arrangement is such that the pitch break connector plate will accommodate top chords of different sizes; and is capable of maintaining the top chords at any one of a range of roof pitches.

27 Claims, 11 Drawing Sheets

TRUSS PITCH BREAK CONNECTOR PLATE

BACKGROUND OF THE INVENTION

1. Field of the Invention

This invention relates to a roof truss, and more particularly to a truss pitch break connector plate for an apex joint of a roof truss.

2. Description of the Prior Art

The prior art is replete with examples of pitch break connectors for roof trusses in a variety of forms. Roof trusses comprise one or more top chords, a bottom chord and one or more brace or web members. The upper ends of the top chords are secured together by connectors of various arrangements, to form apex joints. The bottom chord has opposite ends connected to the lower ends of the top chords by heel joints. The brace or web members extend between and are secured to the top chords and to the bottom chord.

H-shaped connectors have been used at the apex joint and at the heel joints of wooden chord members, see U.S. Pat. No. 2,840,014 (E. A. Wadsworth et al.) Truss pitch break connectors that are adjustable and bolted in place, such that the upper chords are pivotally connected and arranged to be disposed over a selected range of pitch angles is known, see U.S. Pat. No. 3,785,108 (E. W. Satchell). A truss pitch break connector that pivotally connects the upper chords to form a folding truss is disclosed in U.S. Pat. No. 4,538,393 (T. L. Mitchell). Truss pitch break brackets that are bolted in place also are known, see U.S. Pat. No. 4,201,012 (J. Aldag et al) and U.S. Pat. No. 4,854,104 (P. G. Pomento). A scissors truss comprising structural wooden members including pairs of top and bottom chords connected by top apex joint and bottom apex joint and heel joints is known, see U.S. Pat. No. 4,782,641 (T. J. Manenti). A roof bracket is known for attaching wooden rafters to wooden hip beams and wooden ridge beams. The bracket includes two sets of pitch lines for two different size rafters. The pitch lines are used to orient the rafter at different pitches. See U.S. Pat. No. 3,596,941 (C. W. Tracy).

The main drawback of the above described connectors is that they are expensive to manufacture and to install.

BRIEF SUMMARY OF THE INVENTION

In its broadest aspects, the present invention provides a truss pitch break connector plate comprising main body portion having an arcuate first edge, an arcuate second edge, and opposite side edges. A first stiffener flange extends along the arcuate first edge and a second stiffener flange extends along the arcuate second edge.

Further in accordance with the present invention, the truss pitch break connector plate comprises a generally sector-shaped main body portion presenting opposite faces, an arcuate first edge having an outer radius, and an arcuate second edge having inner radius. A first stiffener flange projects from one of the opposite faces along the outer radius, and a second stiffener flange projects from one of the opposite faces along the inner radius. The first and second stiffening flanges are generally perpendicular to the opposite faces of the main body portion, the first stiffening flange projecting from one face while the second stiffening flange projects from the other face in a direction opposite to that of the first stiffening flange.

Still further in accordance with the present invention, an apex joint between at least one top chord and one or more brace members of a roof truss is provided that incorporates connector means fixedly securing the top chord to the brace member to form the apex joint. The present invention provides an improvement in the connector means comprising a plate having a sector-shaped main body portion overlying the top chord and underlying the brace member. The main body portion includes an arcuate first edge having an outer radius, and a second arcuate edge having an inner radius. A first stiffener flange is provided that extends along said outer radius and projects outwardly therefrom; a second stiffener flange is provided that extends along said inner radius and projects outwardly therefrom; and fastening means securing the main body portion to the adjacent upper ends.

Accordingly, it is the principal object of this invention to provide low cost, simple and useable connections for use in the apex joint or joints of a roof truss.

Another object of this invention is to provide a truss pitch break connector plate that will accommodate top chord members of different sizes.

A still further object of this invention is to provide a truss pitch break connector plate that is capable of maintaining the top chord members positioned at roof pitches in the range of from zero angular degrees to 45 angular degrees with respect to the horizontal.

A still further object of this invention is to provide a truss pitch break connector plate that is capable of maintaining the top chord members positioned such that the angle subtended between a pair of top chords is the range of about 90 annular degrees to about 152 angular degrees.

These and other objects and advantages of the present invention will become more readily apparent and understood by reference to the written specification and the appended drawings.

Figure 13:
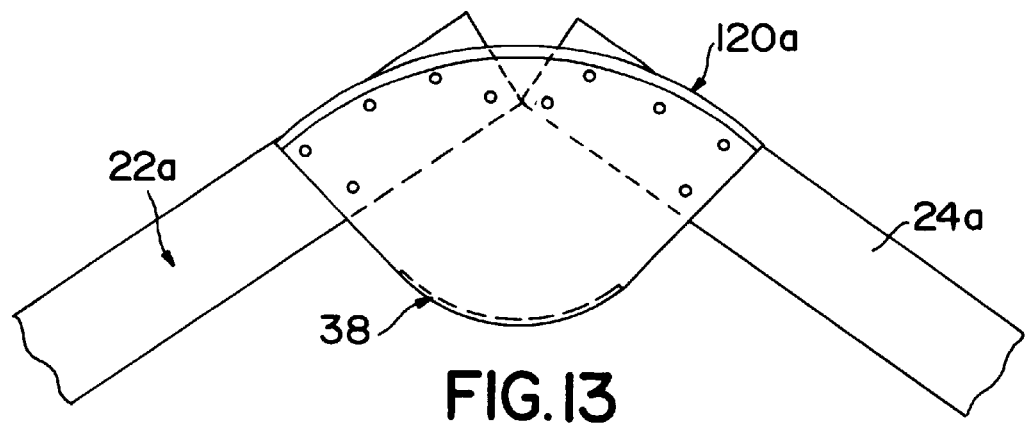
Figure 14:
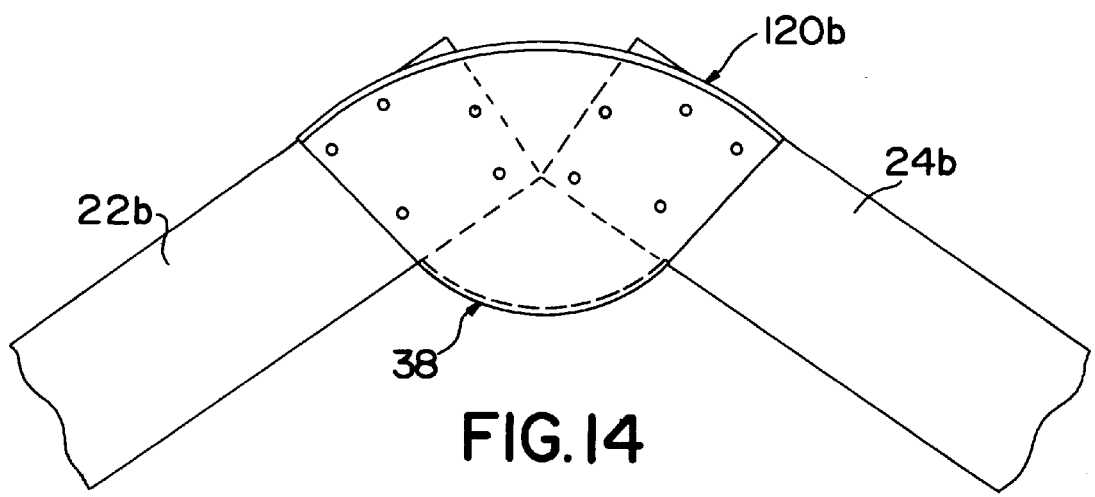
Figure 15:
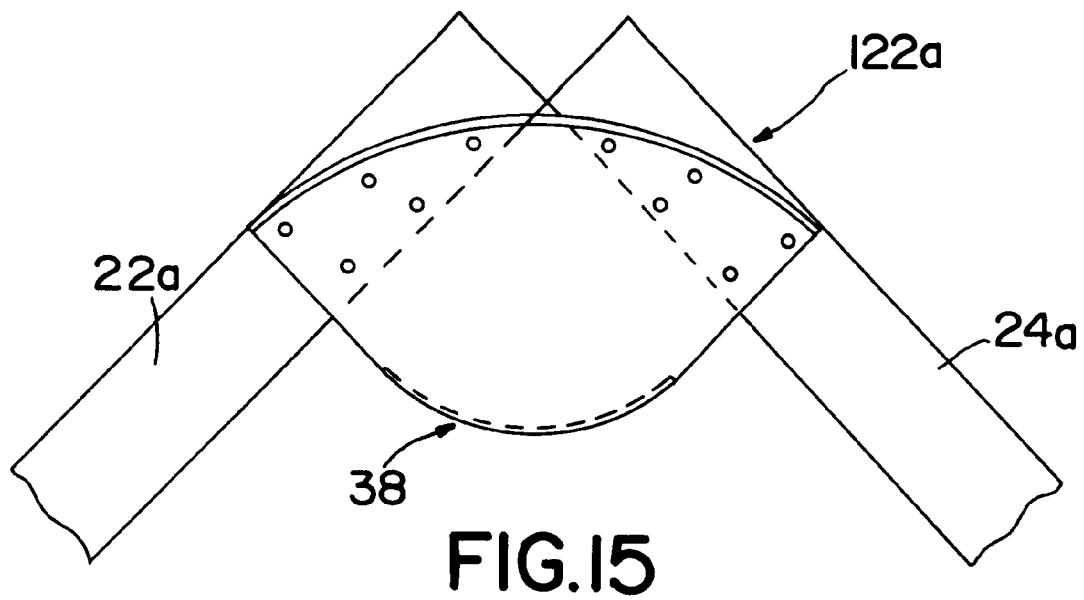
Figure 16:
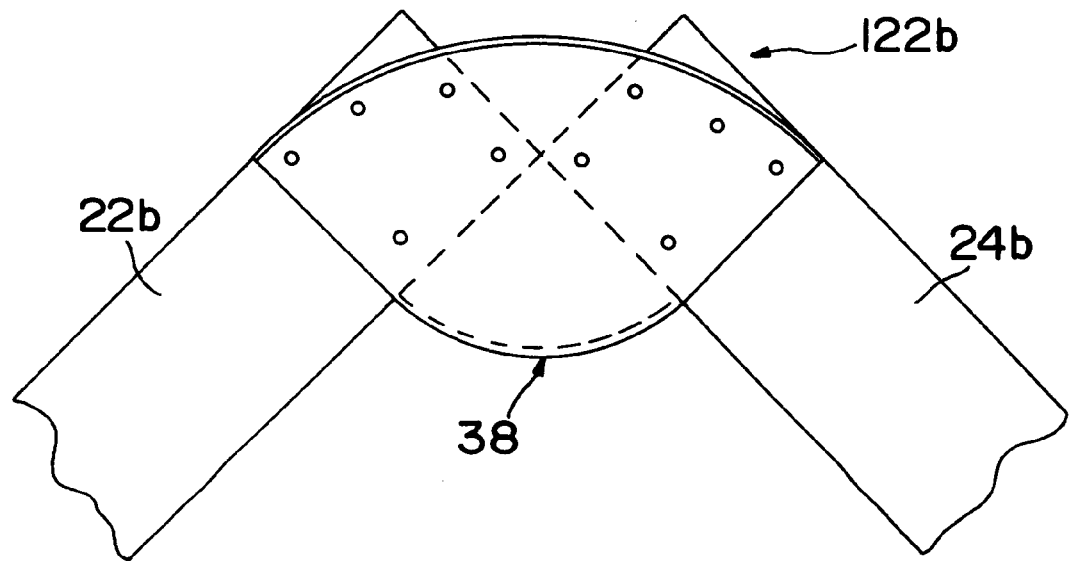
Figure 17:
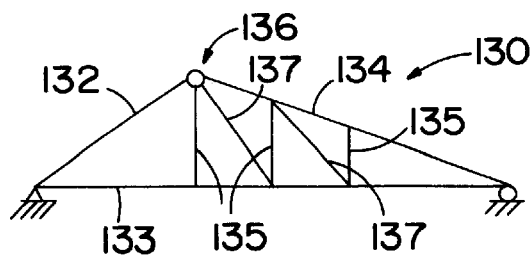
Figure 18:
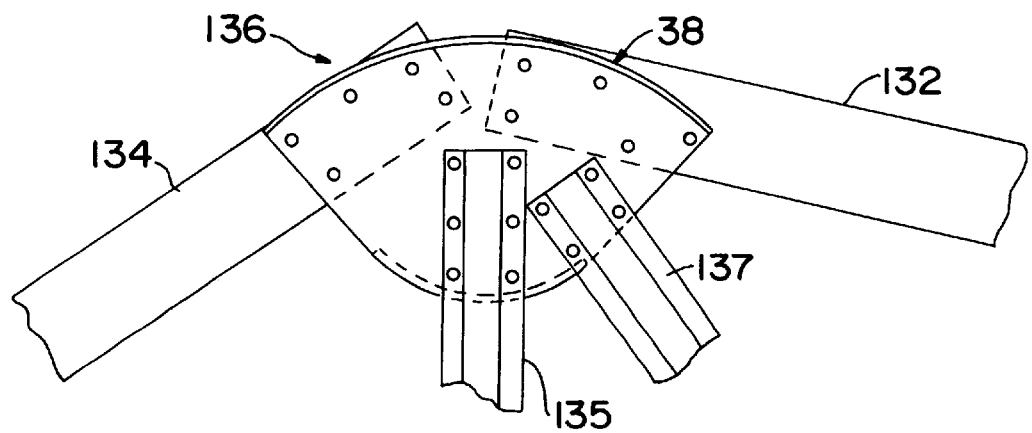
Figure 19:
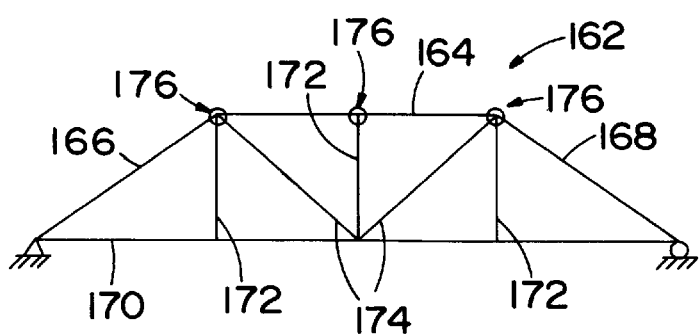
Figure 20:
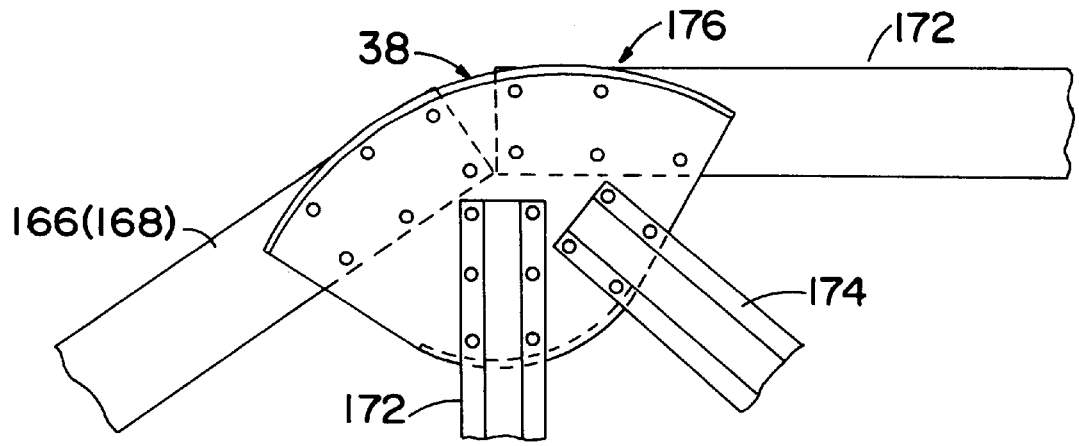
Figure 21:
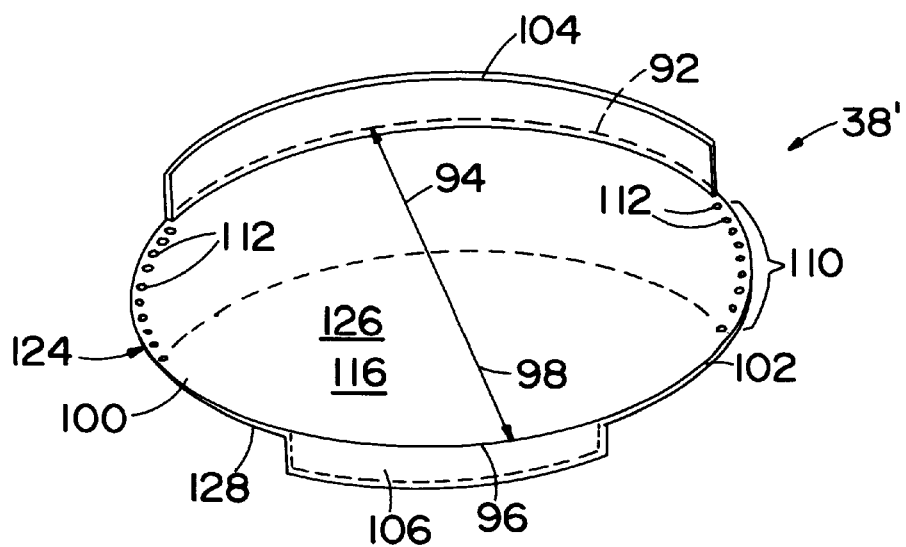
Figure 22:
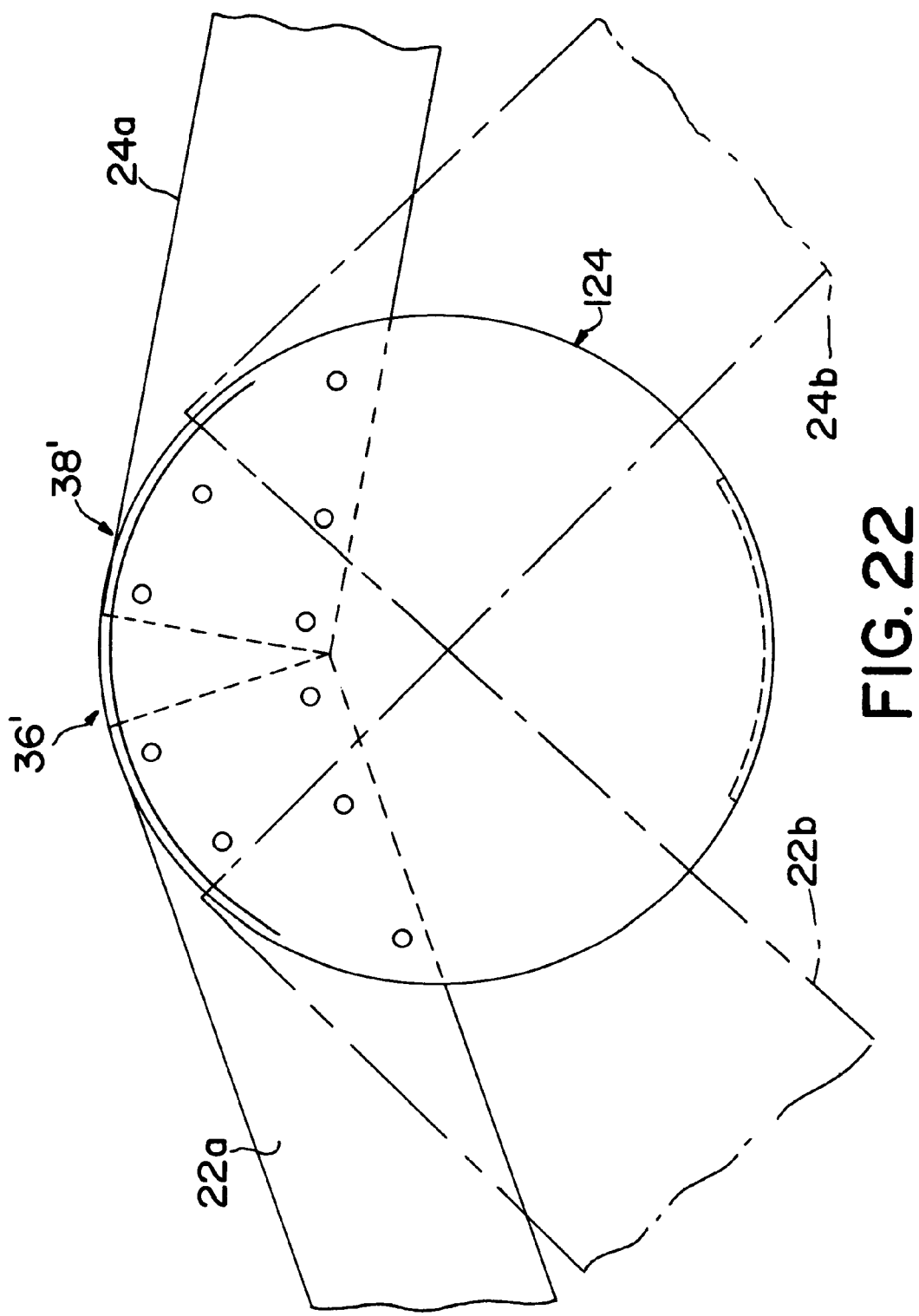

FIGS. 13 and 14 are fragmentary elevation views of the present apex joint incorporating 3⅝ inch (9.21 cm) and 6 inch (15.24 cm) top chords members at a slope of 8 in 12 or 33.7 angular degrees;

FIGS. 15 and 16 are fragmentary elevation views of the present apex joint incorporating 3⅝ inch (9.21 cm) and 6 inch (15.24 cm) top chords members at a slope of 12 in 12 or 45 angular degrees;

FIG. 17 is an elevation view schematically illustrating a truss incorporating two top chords that are inclined at different slopes;

FIG. 18 is a fragmentary elevation view of the present pitch break connector plate utilized in truss of FIG. 17;

FIG. 19 is an elevation view schematically illustrating a truss incorporating a truss incorporating three top chords, one horizontal and two inclined;

FIG. 20 fragmentary elevation view of the present pitch break connector plate utilized in truss of FIG. 19;

FIG. 21 is an isometric view of an alternative embodiment of the present pitch break connector plate; and FIG. 22 is a fragmentary elevation view of an apex joint incorporating the pitch break connector plate of FIG. 21.

DETAILED DESCRIPTION OF THE PRESENTLY PREFERRED EMBODIMENT(S)

Figure 1:
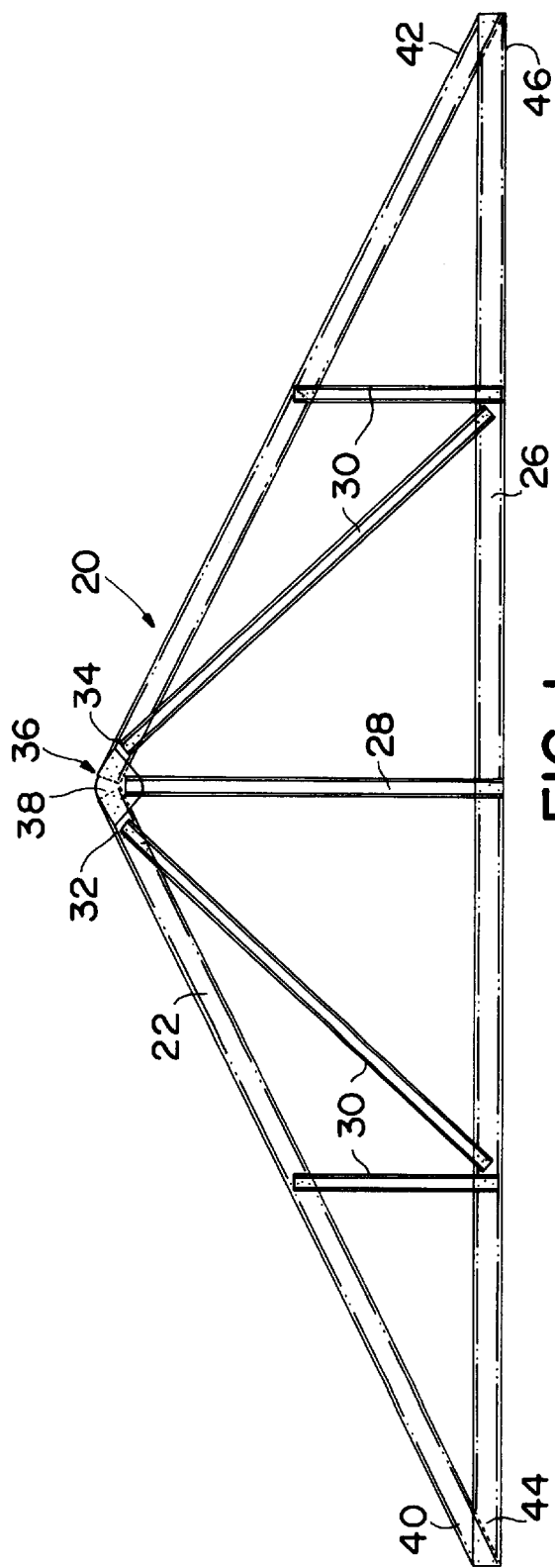
FIG. 1 is an elevation view of a roof truss incorporating the pitch break connector plate of this invention.

Referring to FIG. 1 there is illustrated a roof truss 20 including two top chords 22, 24, a bottom chord 26, a central brace or web member 28 and additional web members 30. The top chords 22, 24 present adjacent ends 32, 34 secured together by means of the present pitch break connector plate 38 to form an apex joint 36. The top chords 22, 24 have lower or remote ends 40, 42 secured to the opposite ends 44, 46 of the bottom chord 26. The central web member 28 has opposite ends, one secured to the pitch break connector plate 38 and one secured to the bottom chord 26. The web members 30 have opposite ends secured to the respective top chord 22, 24 and to the bottom chord 26. The web members 28, 30 rigidify the truss assembly 20.

Figure 2:
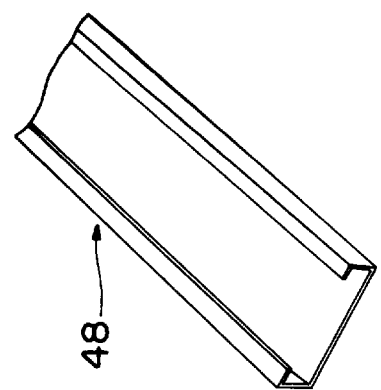
FIG. 2 is an isometric view of a typical channel-shaped member employed in the truss of FIG. 1 as the top chords, the bottom chord and the web members.

FIG. 2 illustrates the profile of a channel-shaped chord member 48 used as the top and bottom chord 22, 24, and 26, and as the central and additional web members 28, 30.

Figure 3:
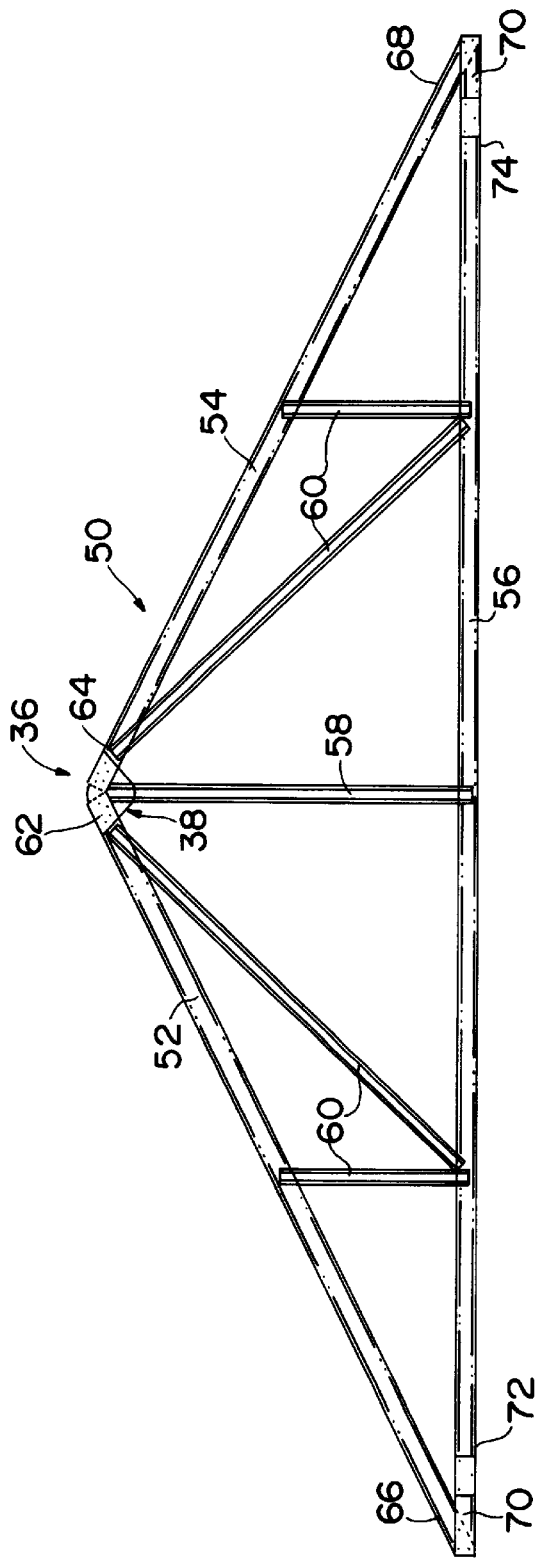
FIG. 3 is an elevation view of an alternative roof truss incorporating the pitch break connector plate of this invention.

FIG. 3 illustrates a roof truss 50 including two top chords 52, 54, a bottom chord 56, a central brace of web member 58 and lateral brace or web members 60. The top chords 52, 54 present adjacent ends 62, 64 secured together by means of the present pitch break connector plate 38 to form an apex joint 36. The top chords 52, 54 have lower or remote ends 66, 68 each secured to a J-shaped stiffener 70 which, in turn, are secured to the opposite ends 72, 74 of the bottom chord 56. The central web member 58 has opposite ends, one secured to the pitch break connector plate 38 and one secured to the bottom chord 56. The lateral web members 60 have opposite ends secured to the respective top chord 52, 54 and to the bottom chord 56.

Figure 4:
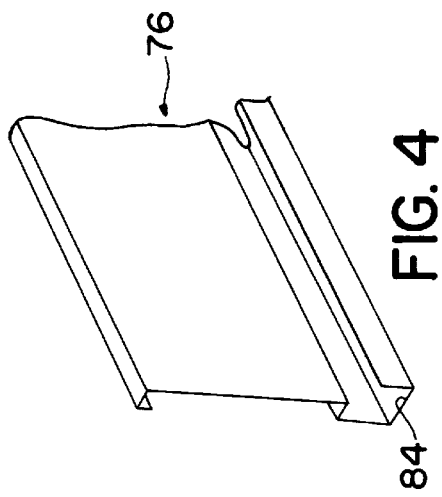
FIG. 4 is an isometric view of a profiled member employed as the top chords and the bottom chord of the truss of FIG. 3.
Figure 5:
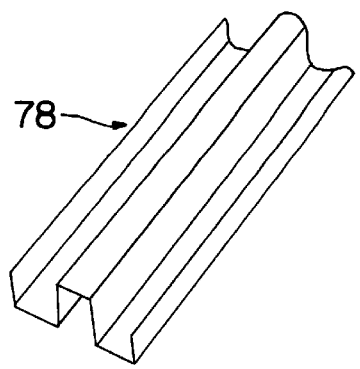
FIG. 5 is an isometric view of a profiled member employed as the web member of the truss of FIG. 3.
Figure 6:
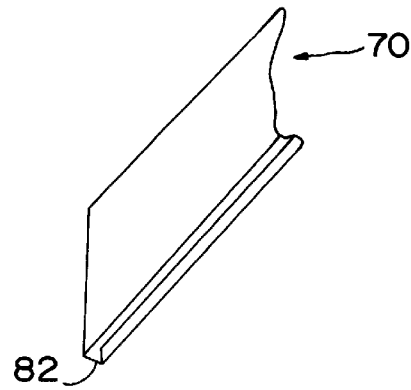
FIG. 6 is an isometric view of a profiled member employed as the heel connecting element in the bottom chord of the truss of FIG. 3.
Figure 6A:
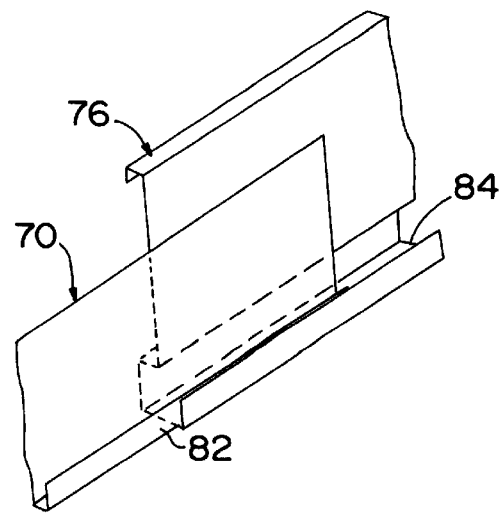
FIG. 6A is an isometric view of the profiled member of FIG. 6 fitted within a U-shaped bottom portion of the profiled member of FIG. 4

FIG. 4 illustrates a profiled chord element 76 used as the top and bottom chords 52, 54 and 56 of the roof truss 50. FIG. 5 illustrates a profiled web element 78 used as the central and lateral web members 58, 60 of the roof truss 50. FIG. 6 illustrates the profile of the J-shaped stiffener element 70. The J-shaped stiffener element 70 includes a U-shaped bottom portion 82 that is adapted to fit within a U-shaped bottom portion 84 of the profiled chord element 76 as illustrated in FIG. 6A.

Figure 7:
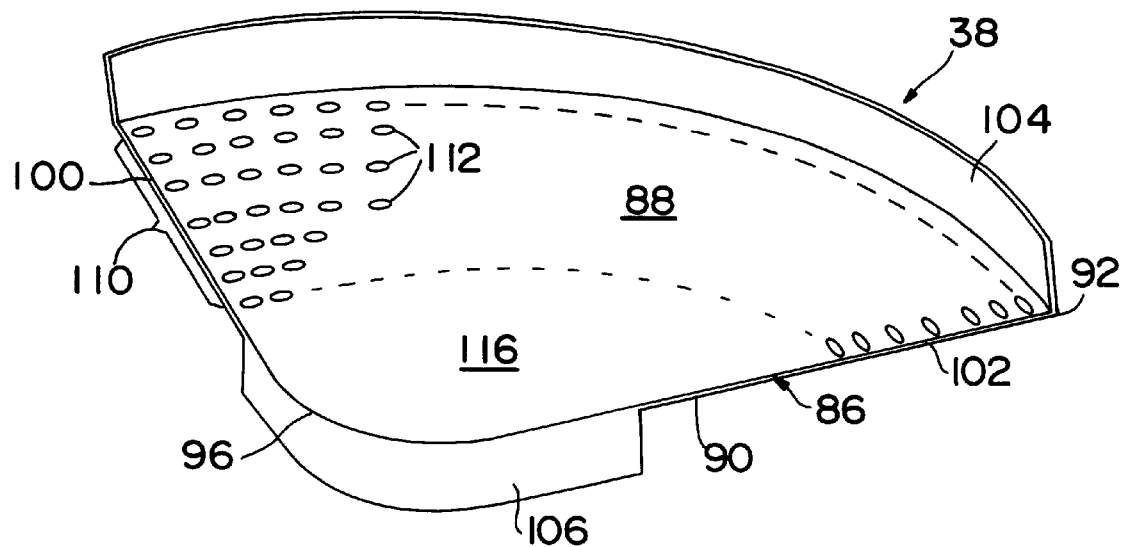
FIG. 7 is an isometric view of the present pitch break connector plate.
Figure 8:
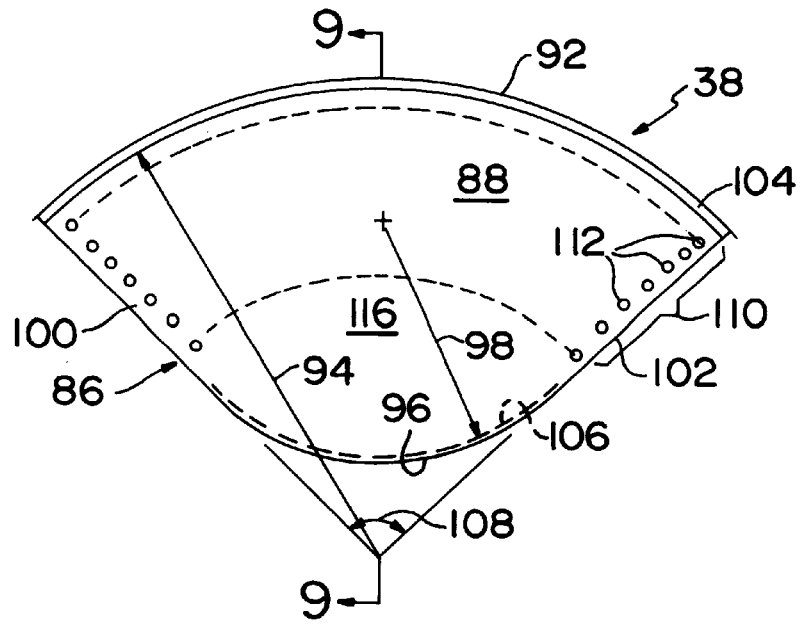
FIG. 8 is a plan view of the present pitch break connector plate.
Figure 9:
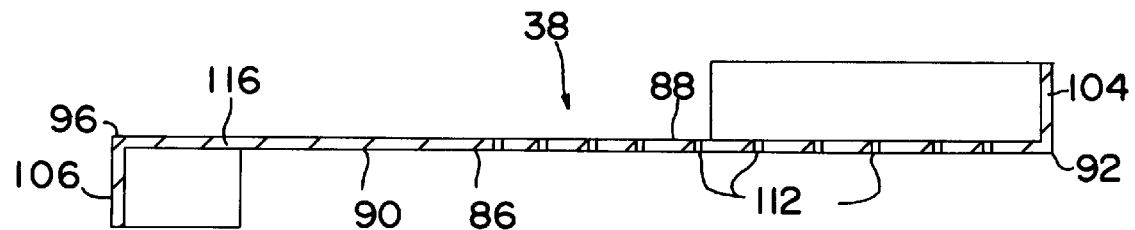
FIG. 9 is a cross-section view, taken along the line 9—9 of FIG. 8, further illustrating the pitch break connector plate of this invention.

Referring to FIGS. 7, 8 and 9, the pitch break connector plate 38 of this invention comprises a main body portion 86 which preferably is sector-shaped and has opposite faces 88, 90 as best seen in FIGS. 7, 9. The main body portion 86 (FIG. 8) includes an arcuate first edge 92 having an outer radius represented by the arrow labeled 94, an arcuate second edge 96 having an inner radius represented by the arrow labeled 98, and opposite side edges 100, 102. Additionally, a first stiffening flange 104 extends along the arcuate first edge 92, and a second stiffening flange 106 extends along the arcuate second edge 96.

As best shown in FIGS. 7 and 9, the first and second stiffening flanges 104, 106 each are generally perpendicular to the main body portion 86. In the preferred arrangement, the first stiffening flange 104 projects outwardly from the face 88 of the main body portion 86 whereas the second stiffening flange 106 projects from the opposite face 90 of the main body portion 86, that is, in a direction opposite to that of the first stiffening flange 104.

As best shown in FIG. 8, the outer radius 94 of the first edge 92 is larger than the inner radius 96. In a commercial embodiment of the connector plate 38, the outer radius 94 had a value of 12 inches (30.48 cm) while the inner radius 98 had a value of 6 inches (15.24 cm). The sector shape of the main body portion 86 is such that the opposite edges 100, 102 subtend an angle represented by the arc labeled 108 of approximately 90 angular degrees.

Figure 10:
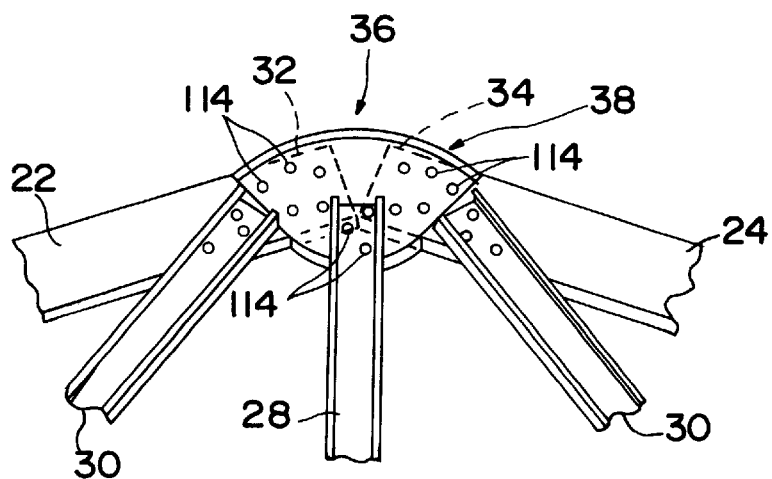
FIG. 10 is a fragmentary isometric view of the apex joint of the roof truss of FIG. 1.

The main body portion 86 is provided with a band 110 of perforations 112 (FIGS. 7 and 8) along that portion of the main body portion 86 adjacent to the arcuate first edge 92, to facilitate attachment of the connector plate 38 to the adjacent ends 32, 34 of the top chords 22, 24 by screws 114 as shown in FIG. 10. The apertures 112 also serve to guide the screws 114 during installation thereby minimizing wandering of the screws 114.

The main body portion 86 also presents an imperforate lower portion 116 to which the upper end of the central web member 28 is attached by screws 114, as shown in FIG. 10.

Figure 11:
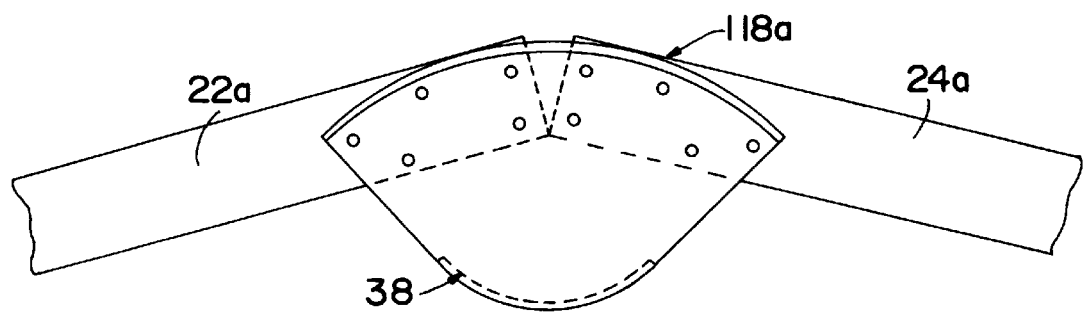
FIGS. 11 and 12 are fragmentary elevation views of the present apex joint incorporating 3⅝ inch (9.21 cm) and 6 inch (15.24 cm) top chords members at a slope of 3 in 12 or 14 angular degrees.
Figure 12:
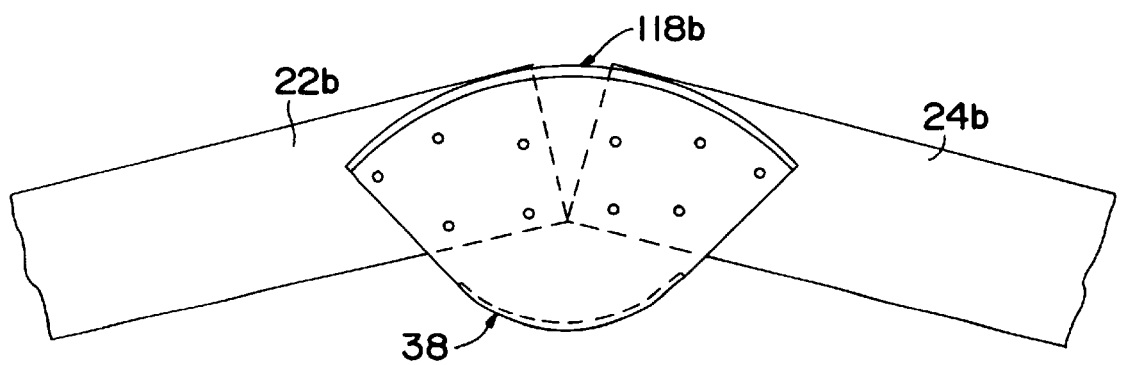

FIGS. 11, 13 and 15 illustrate apex joints 118a, 120a and 122a wherein top chords 22a, 24a of 3.625 inches (9.21 cm) width, are secured to the connector plate 38 and maintained thereby, respectively, at slopes with respect to the horizontal of 3 in 12 (14 angular degrees), 8 in 12 (33.7 angular degrees) and 12 in 12 (45 angular degrees). Similarly, FIGS. 12, 14 and 16, illustrate apex joints 118b, 120b and 122b where top chords 22b, 24b that are 6 inches (15.24 cm) width, are secured to the connector plate 38 and maintained thereby, respectively, at slopes with respect to the horizontal of 3 in 12 (14 angular degrees), 8 in 12 (33.7 angular degrees) and 12 in 12 (45 angular degrees).

The trusses 20 and 50 of FIGS. 1 and 5 are in the form of isosceles triangles wherein the top chords 22,24 and 52,54 are inclined at the same slope. A roof truss may also take other forms such as shown, for example, in FIGS. 17, 19.

Referring to FIG. 17, a truss 130 is schematically illustrated that incorporates two top chords 132, 134, a bottom chord 133, and vertical or diagonal brace members 135, 137 respectively. The top chords 132, 134 of the truss 130 are inclined at different slopes. For example, the top chord 132 is inclined at a slope with respect to the horizontal of approximately 33 angular degrees while the top chord 134 is inclined at a slope with respect to the horizontal of approximately 18 angular degrees. The top chords 132, 134 are rigidly connected at an apex joint represented by the circle labeled 136. As shown in FIG. 18, the apex joint 136 is formed by and incorporate the present pitch break connector plate 38.

Referring to FIG. 19, a truss 162 is schematically illustrated that includes three top chords 164, 166, 168, a bottom chord 170, and vertical and diagonal brace members 172, 174, respectively. In this instance, the top chord 164 is horizontal (zero slope with respect to the horizontal). The top chords 166, 168 are each inclined, for example, at a slope with respect to the horizontal of approximately 34 angular degrees. The top chord 164, 166, 168 are rigidly connected to the vertical and diagonal brace members 172, 174 at apex joints represented by the circles labeled 176. As shown in FIG. 20, each of the apex joints 176 is formed by and incorporates the present pitch break connector plate 38.

FIGS. 21 and 22 illustrate an alternative embodiment of the present peak connection plate that is identified by the numeral 38'. Corresponding numerals will be employed to identify corresponding parts heretofore described.

The alternative peak connector 38 (FIG. 21) presents a main body portion 124 having faces 126, 128. In this embodiment, the main body portion 124 is circular in shape and includes an arcuate first edge 92 having an outer radius represented by the arrow labeled 94, and an arcuate second edge 96 having an inner radius represented by the arrow labeled 98. Additionally, a first stiffening flange 104 extends along the arcuate first edge 92, and a second stiffening flange 106 extends along the arcuate second edge 96. As in the preferred embodiment, the first and second stiffening flanges 104, 106 each are generally perpendicular to the main body portion 124. Also as in the preferred embodiment, the first stiffening flange 104 projects outwardly from the face 126 whereas the second stiffening flange 128 projects outwardly from the opposite face 128, that is, in a direction opposite to that of the first stiffening flange 104.

In as much as the main body portion 124 is circular, the outer radius 94 is equal to the inner radius 98. The inner and outer radii each may equal 5 inches (12.7 cm).

The main body portion 124 is provided with a band 110 of perforations 112 along that portion of the main body portion 124 adjacent to the arcuate first edge 92, to facilitate attachment of the connector plate 38' to the adjacent ends of the top chords 22a, 24a and 22b, 24b, as shown in FIG. 18. Wandering of the screws 114 during installation thereof is minimized by the apertures 112. The main body portion also presents an imperforate lower portion 116 to which central web members are attached.

FIG. 22 illustrates an apex joint 36' wherein the pitch break connector plate 38' supports a pair of narrow top chords 22a, 24a, shown in full lines, at a slope with respect to the horizontal of 3 in 12 or 14 angular degrees. For the purpose of illustration, the pitch break connector plate 38' also supports a pair of wide top chords 22b, 24b, shown in dash dot outline, at a slope with respect to the horizontal of 12 in 12 or 45 angular degrees.

The present pitch break connector plate 38 and 38' may be formed from steel having a thickness in the range of from 0.032 inches (0.081 cm) to 0.124 inches (0.315 cm) and by means of stamping processes well known in the art. The present pitch break connector plate 38 is capable of accommodating top chord members of various sizes within the range of 2.5 inches (6.351 cm) through 6 inches (15.24 cm). The present pitch break connector plate 38 is also capable of maintaining each top chord at pitch angles or slopes, in the range of from zero angular degrees through 45 angular degrees relative to the horizontal. Where a truss incorporates two top chords, the present pitch break connector plate 38 is capable of maintaining the top chord members oriented such that the angle subtended between the two top chords is in the range of from about 90 angular degrees to about 152 angular degrees.

Accordingly it should be readily apparent from the foregoing description and drawings that the present invention provides a low cost, simple and useable truss pitch break connector plate for use in the apex joint of roof truss assemblies; a truss pitch break connector plate that will accommodate top chords of different sizes; and a truss pitch break connector plate that is capable of maintaining the top chords positioned at any one of a range of roof pitches.

It will be readily apparent to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embodied therein.

I claim:

1. A truss pitch break connector plate comprising:

a main body portion having an arcuate first edge, an arcuate second edge, and opposite side edges;

a first stiffener flange along said arcuate first edge; and a second stiffener flange along said arcuate second edge;

said truss pitch break connector plate being adapted to accommodate two chords oriented at a selected angle with respect to one another, said angle being selectable from a range comprising at least two possible angles of orientation.

2. The truss pitch break connector plate as defined in claim 1 wherein said arcuate first edge has a first radius; and said arcuate second edge has a second radius that is less than said first radius.

3. The truss pitch break connector plate as defined in claim 2 wherein said first radius is twice as large as said second radius.

4. The truss pitch break connector plate as defined in claim 2 wherein said first radius of said arcuate first edge is equal to the second radius of said arcuate second edge.

5. The truss pitch break connector plate as defined in claim 1 wherein said first stiffener flange is generally perpendicular to said main body portion and extends outwardly therefrom; and said second stiffener flange is generally perpendicular to said main body portion and extends outwardly therefrom in a direction opposite to that of said first stiffening flange.

6. The truss pitch break connector plate as defined in claim 1 wherein said opposite side edges converge from said first arcuate edge toward said second arcuate edge.

7. The truss pitch break connector plate as defined in claim 1 wherein said main body portion includes a band of perforations along that portion adjacent to said first arcuate edge.

8. A truss pitch break connector plate comprising:

a generally sector-shaped main body portion presenting opposite faces, an arcuate first edge having an outer radius, and arcuate second edge having an inner radius, a first stiffening flange projecting from one of said opposite faces and extending along said outer radius; and a second stiffening flange projecting from one of said opposite faces and extending along said inner radius;

said truss pitch break connector plate being adapted to accommodate two chords oriented at a selected angle with respect to one another, said angle being selectable from a range comprising at least two possible angles of orientation.

9. The truss pitch break connector plate as defined in claim 8 wherein said inner radius is less than said outer radius.

10. The truss pitch break connector plate as defined in claim 8 wherein said outer radius is twice as large as said inner radius.

11. The truss pitch break connector plate as defined in claim 8 wherein said second stiffening flange projects from said main body portion in a direction opposite to that of said first stiffener flange.

12. The truss pitch break connector plate as defined in claim 8 wherein said main body portion presents a band of perforations along that portion adjacent to said first arcuate edge.

13. In an apex joint between at least one top chord and one or more brace members of a roof truss, connector means fixedly securing said top chord to said brace member to form said apex joint, the improvement in said connector means comprising:

a plate comprising a main body portion overlying said top chord and underlying said brace member, said main body portion including an arcuate first edge having an outer radius, and an arcuate second edge having an inner radius;

a first stiffener flange extending along said outer radius and projecting outwardly therefrom;

a second stiffener flange extending along said inner radius and projecting outwardly therefrom; and fastening means securing said main body portion to adjacent ends of said at least one top chord and of said one or more brace members;

said connector means being adapted to accommodate two chords oriented at a selected angle with respect to one another, said angle being selectable from a range comprising at least two possible angles of orientation.

14. The improvement as defined in claim 13 wherein said main body portion is sector-shaped; and said inner radius is less than said outer radius.

15. The improvement as defined in claim 13 wherein said first stiffener flange is generally perpendicular to said main body portion and extends outwardly therefrom, away from said top chords; and said second stiffener flange is generally perpendicular to said main body portion and extends outwardly therefrom in a direction opposite to that of said first stiffener flange.

16. The improvement as defined in claim 13 wherein said main body portion includes a band of perforations along that portion of said main body portion adjacent to said first arcuate edge.

17. The improvement as defined in claim 13 wherein said outer radius is equal to said inner radius.

18. The improvement as defined in claim 13 wherein said truss includes two top chords, said top chords are each inclined at a slope with respect to the horizontal in the range of about zero angular degrees to about forty five angular degrees.

19. The improvement as defined in claim 13 wherein said truss includes two top chords each inclined at a different slope with respect to the horizontal.

20. The improvement as defined in claim 13 wherein said truss includes two top chords each inclined at the same slope with respect to the horizontal.

21. The improvement as defined in claim 13 wherein said truss includes two top chords, and wherein the angle subtended between said two top chords is in the range of from 90 angular degrees to about 152 angular degrees.

22. A truss pitch break connector plate comprising:

a main body portion having an arcuate first edge, an arcuate second edge, and opposite side edges;

a first stiffener flange along said arcuate first edge; and a second stiffener flange along said arcuate second edge;

each of said arcuate first and second edges having a convex side and a concave side, said concave sides of said arcuate first and second edges being disposed to face one another.

23. A truss pitch break connector plate comprising:

a main body portion having an arcuate first edge, an arcuate second edge, and opposite side edges;

a first stiffener flange along said arcuate first edge; and a second stiffener flange along said arcuate second edge;

said first stiffener flange being generally perpendicular to said main body portion and extending outwardly therefrom;

said second stiffener flange being generally perpendicular to said main body portion and extending outwardly therefrom in a direction opposite to that of said first stiffening flange.

24. A truss pitch break connector plate comprising:

a generally sector-shaped main body portion presenting opposite faces, an arcuate first edge having an outer radius, and arcuate second edge having an inner radius, a first stiffening flange projecting from one of said opposite faces and extending along said outer radius; and a second stiffening flange projecting from one of said opposite faces and extending along said inner radius;

each of said arcuate first and second edges having a convex side and a concave side, said concave sides of said arcuate first and second edges being disposed to face one another.

25. A truss pitch break connector plate comprising:

a generally sector-shaped main body portion presenting opposite faces, an arcuate first edge having an outer radius, and arcuate second edge having an inner radius, a first stiffening flange projecting from one of said opposite faces and extending along said outer radius; and a second stiffening flange projecting from one of said opposite faces and extending along said inner radius;

said second stiffening flange projecting from said main body portion in a direction opposite to that of said first stiffening flange.

26. In an apex joint between at least one top chord and one or more brace members of a roof truss, connector means fixedly securing said top chord to said brace member to form said apex joint, the improvement in said connector means comprising:

a plate comprising a main body portion overlying said top chord and underlying said brace member, said main body portion including an arcuate first edge having an outer radius, and an arcuate second edge having an inner radius;

a first stiffener flange extending along said outer radius and projecting outwardly therefrom;

a second stiffener flange extending along said inner radius and projecting outwardly therefrom; and fastening means securing said main body portion to adjacent ends of said at least one top chord and of said one or more brace members;

each of said arcuate first and second edges having a convex side and a concave side, said concave sides of said arcuate first and second edges being disposed to face one another.

27. In an apex joint between at least one top chord and one or more brace members of a roof truss, connector means fixedly securing said top chord to said brace member to form said apex joint, the improvement in said connector means comprising:

a plate comprising a main body portion overlying said top chord and underlying said brace member, said main body portion including an arcuate first edge having an outer radius, and an arcuate second edge having an inner radius;

a first stiffener flange extending along said outer radius and projecting outwardly therefrom;

a second stiffener flange extending along said inner radius and projecting outwardly therefrom; and fastening means securing said main body portion to adjacent ends of said at least one top chord and of said one or more brace members;

said first stiffener flange being generally perpendicular to said main body portion and extending outwardly therefrom, away from said top chords; and said second stiffener flange being generally perpendicular to said main body portion and extending outwardly therefrom in a direction opposite to that of said first stiffener flange.

\* \* \* \* \*

UNITED STATES PATENT AND TRADEMARK OFFICE
CERTIFICATE OF CORRECTION

PATENT NO.: 5,983,589

DATED: November 16, 1999

INVENTOR(S): L. Randy Daudet

It is certified that an error appears in the above-identified patent and that said Letters Patent is hereby corrected as shown below:

Claim 5, column 6, lines 49-50, delete "stiffening" and replace with --stiffener--.

Claim 8, column 6, line 62, insert --an-- between "and" and "arcuate".

Claim 11, column 7, line 18, delete "stiffener" and replace with --stiffening--.

Signed and Sealed this

Twenty-second Day of May, 2001

*Attest:*

NICHOLAS P. GODICI

*Attesting Officer*    *Acting Director of the United States Patent and Trademark Office*